United States Patent [19]

Snow et al.

[11] 4,074,634
[45] Feb. 21, 1978

[54] CARGO CONTAINER WITH A CARGO RESTRAINT SYSTEM HAVING ADJUSTABLE PANELS

[75] Inventors: Conley H. Snow, Clawson, Mich.; Rudolph Messerschmidt, Alexandria, Va.

[73] Assignees: Brooks & Perkins, Incorporated, Southfield, Mich. ; by said Snow; The United States of America as represented by the Secretary of the Army, Washington, D.C. ; by said Messerschmidt

[21] Appl. No.: 668,924

[22] Filed: Mar. 22, 1976

[51] Int. Cl.² .............................................. B61D 45/00
[52] U.S. Cl. .................................. 105/493; 105/495; 105/497; 105/504; 280/179 B
[58] Field of Search ................... 105/366 R, 376, 463, 105/489, 493–495, 497–504; 220/1.5; 248/119 R; 280/179 R, 179 A, 179 B; 296/24 R

[56] References Cited

U.S. PATENT DOCUMENTS

| | | | |
|---|---|---|---|
| 3,095,830 | 7/1963 | Runken | 105/376 X |
| 3,212,458 | 10/1965 | Robertson | 105/494 |
| 3,327,648 | 6/1967 | Patch | 105/503 |
| 3,642,154 | 2/1972 | Duszka | 214/516 X |
| 3,815,500 | 6/1974 | Glassmeyer | 105/503 |
| 3,820,475 | 6/1974 | Beeson | 105/376 |

FOREIGN PATENT DOCUMENTS 1,079,093  4/1960  Germany .............................. 105/497

Primary Examiner—Lawrence J. Oresky
Assistant Examiner—Carl Rowold
Attorney, Agent, or Firm—Whittemore, Hulbert & Belknap

[57] ABSTRACT

A cargo container having initially four vertical corner posts comprising parallel upper rails and upper belt rails affixed to extend between longitudinally spaced pairs of posts, vertical belt rails affixed to each of the corner posts, parallel lower rails and belt rails, a plurality of pairs of panels each having a plurality of horizontally extending parallel belt rails, and releasable means for connecting the panels to the upper and lower rails at one side of the container in different longitudinally adjusted positions.

6 Claims, 7 Drawing Figures

CARGO CONTAINER WITH A CARGO RESTRAINT SYSTEM HAVING ADJUSTABLE PANELS

BRIEF SUMMARY OF THE INVENTION

The present invention relates to the conversion of standard vehicular cargo containers, such for example as the cargo carrying space of a truck, trailer, aircraft, or the like, in which the vehicle presents an elongated cargo space of moderate height and width. A typical example may be a container having a length of about 20 feet, a height of about 8 feet, and a transverse width of about 8 feet. This cargo space is defined between a floor, side walls, and a ceiling or roof, and includes metallic support posts at each corner of the space.

In accordance with the present invention, upper rails are affixed to the top corners of the posts at each side of the cargo space and each of the upper rails carries an upper belt rail provided with a multiplicity of inwardly facing openings for association with removable and adjustable cargo restraint bars. The cargo space as originally provided includes transversely extending top cross pieces maintaining the upper edges of the side walls at a constant spacing.

Vertical belt rails are affixed to the inner sides of the four corner posts, each of the vertical belt rails including openings for the reception of support elements on the ends of removable and adjustable restraint bars.

Lower rails and belt rails are provided to extend between corner posts along the longitudinal sides of the cargo space. These are generally similar to the longitudinally extending upper rails and belt rails previously described.

A multiplicity of pairs of adjustable panels are provided each of which is provided with vertically extending retractable resiliently urged locking pins at the top and bottom, these pins being receivable in openings in the adjacent surfaces of the upper and lower rails. With this construction a pair of panels may be moved into whatever position is required to support one or a plurality of restraint bars at any desired position within the cargo container.

The upper and lower rails are generally in the form of extrusions having longitudinally extending recesses at the inner sides thereof and the belt rails are attached directly to the rails so as to cover the longitudinally extending recesses, which provides space for receiving the ends of latch elements on the ends of the restraint bars.

The cargo container as previously described in the foregoing is intended to provide a safe storage and restraint system suitable for transporting hazardous cargo such for example as ammunition in interstate commerce.

DETAILED DESCRIPTION

Figure 1:
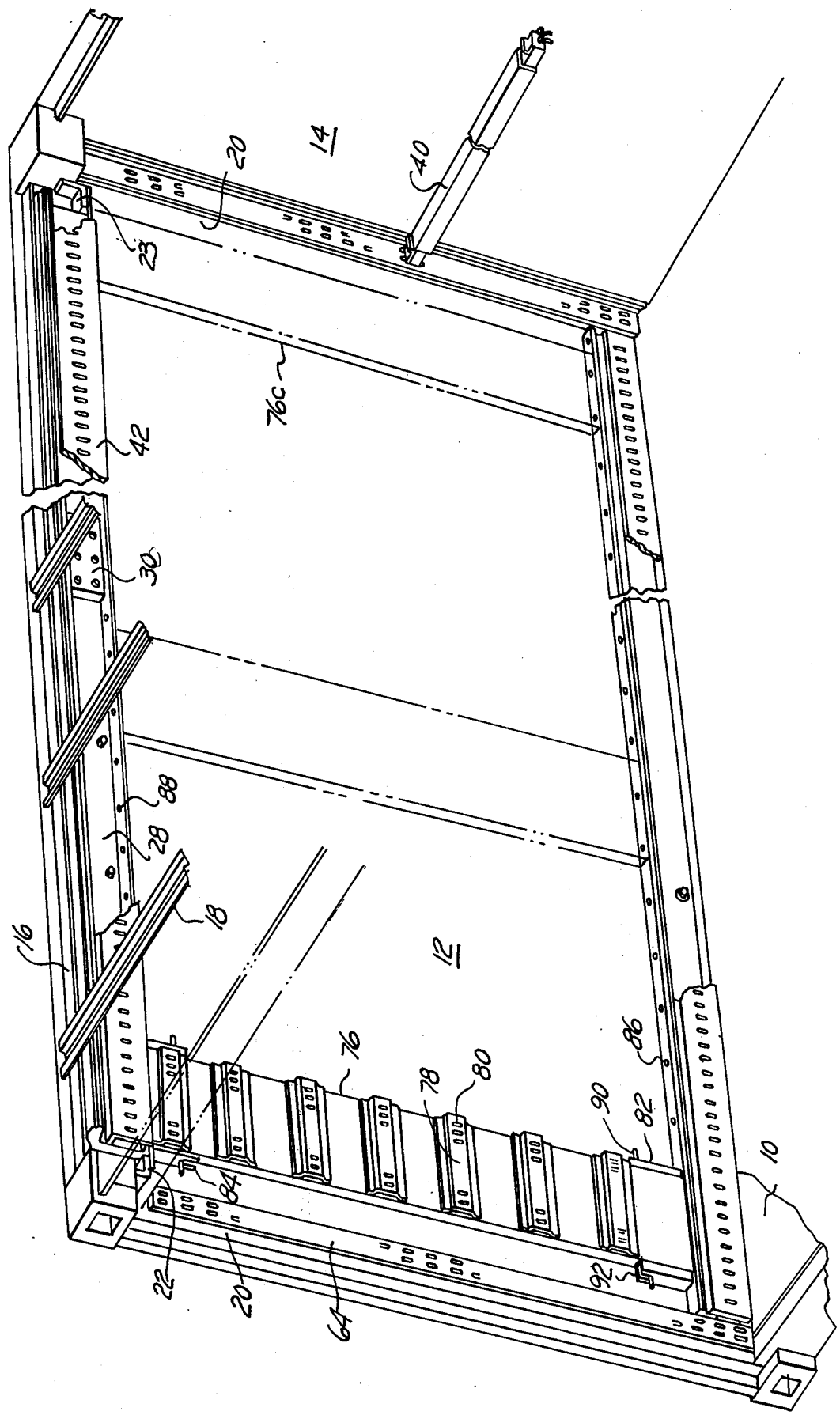
FIG. 1 is a perspective view of a side of the cargo container.
Figure 2:
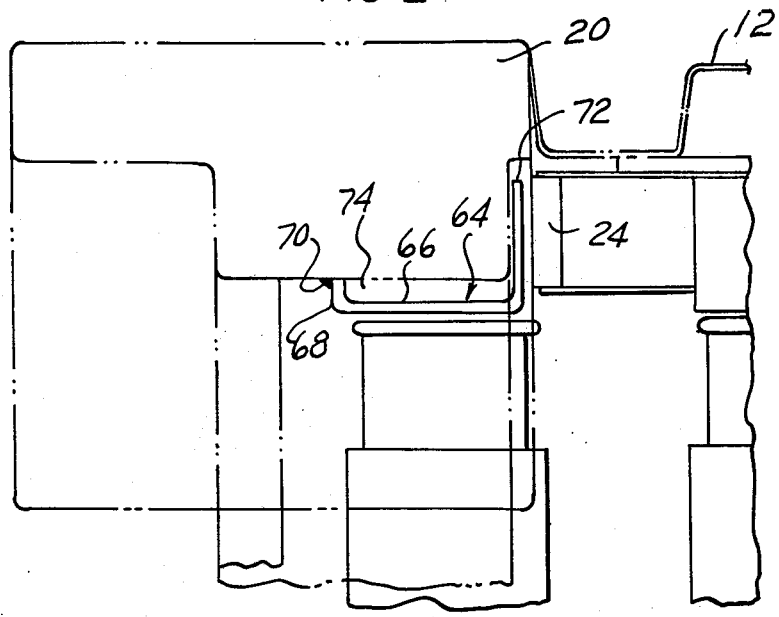
FIG. 2 is a fragmentary plan view illustrating the connection between vertical corner posts of the vehicle, the upper rail and the vertical belt rail.

The cargo space is defined between a floor 10, side walls 12, a front wall 14, and an enclosing roof structure (not shown). The side walls 12 may conveniently be in the form of corrugated aluminum sheeting provided along the upper edge with longitudinal support elements 16 which are interconnected by permanently attached transverse top bars 18, thus maintaining the side walls 12 in parallel vertical relationship.

At each corner of the longitudinally elongated cargo space defined between the side walls 12 of the vehicle are corner posts 20. In order to provide an adequate support for the structure later to be described, L-shaped support brackets 22 having vertical legs 24 and horizontal legs 26 are welded to the tops of the rear posts 20. Identical brackets 23 are provided and are welded to the top of the front corner posts. Brackets 22 and 23 constitute end supports for elongated upper rails 28 which may be of one-piece construction and adapted to extend between the rear L-shaped bracket 22 and the front L-shaped bracket 23.

Figure 3:
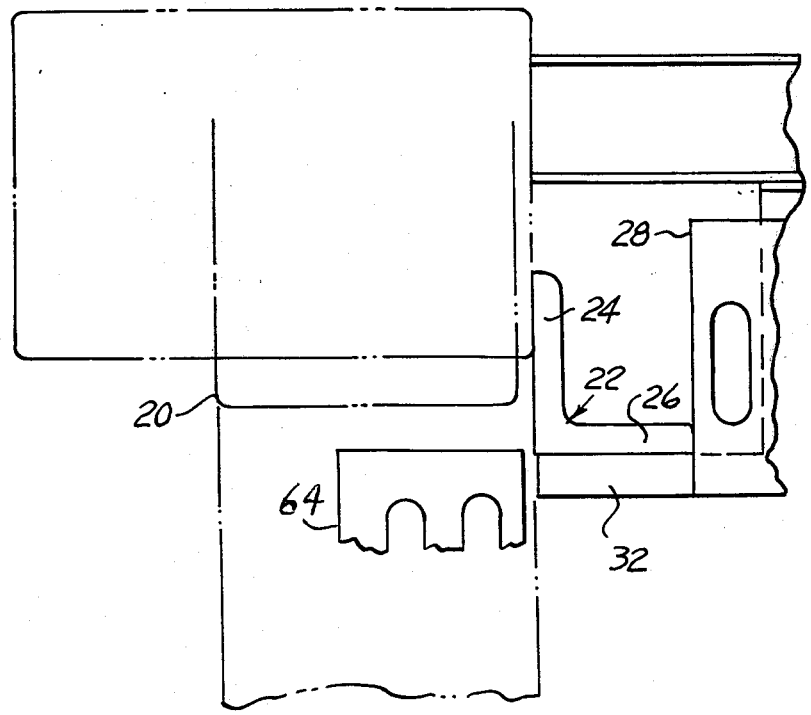
FIG. 3 is a fragmentary horizontal view of the structure shown in FIG. 2.

The upper rails 28 may be of one-piece or they may be of shorter lengths interconnected by splice elements 30. As best seen in FIG. 3, each of the upper rails 28 include integrally extending flat end portions 32 adapted to be permanently and rigidly connected to the support brackets 22 and 23. Conveniently, the rails 28 are in the form of extrusions having a cross-sectional shape which will presently be described in detail, the end portions of the extrusions being cut away to provide the flat end attachment portions 32. The connection between the horizontal legs 26 of the L-shaped brackets and the attachment portions 32 may be by conventional fastening means such for example as nuts and bolts.

Figure 5:
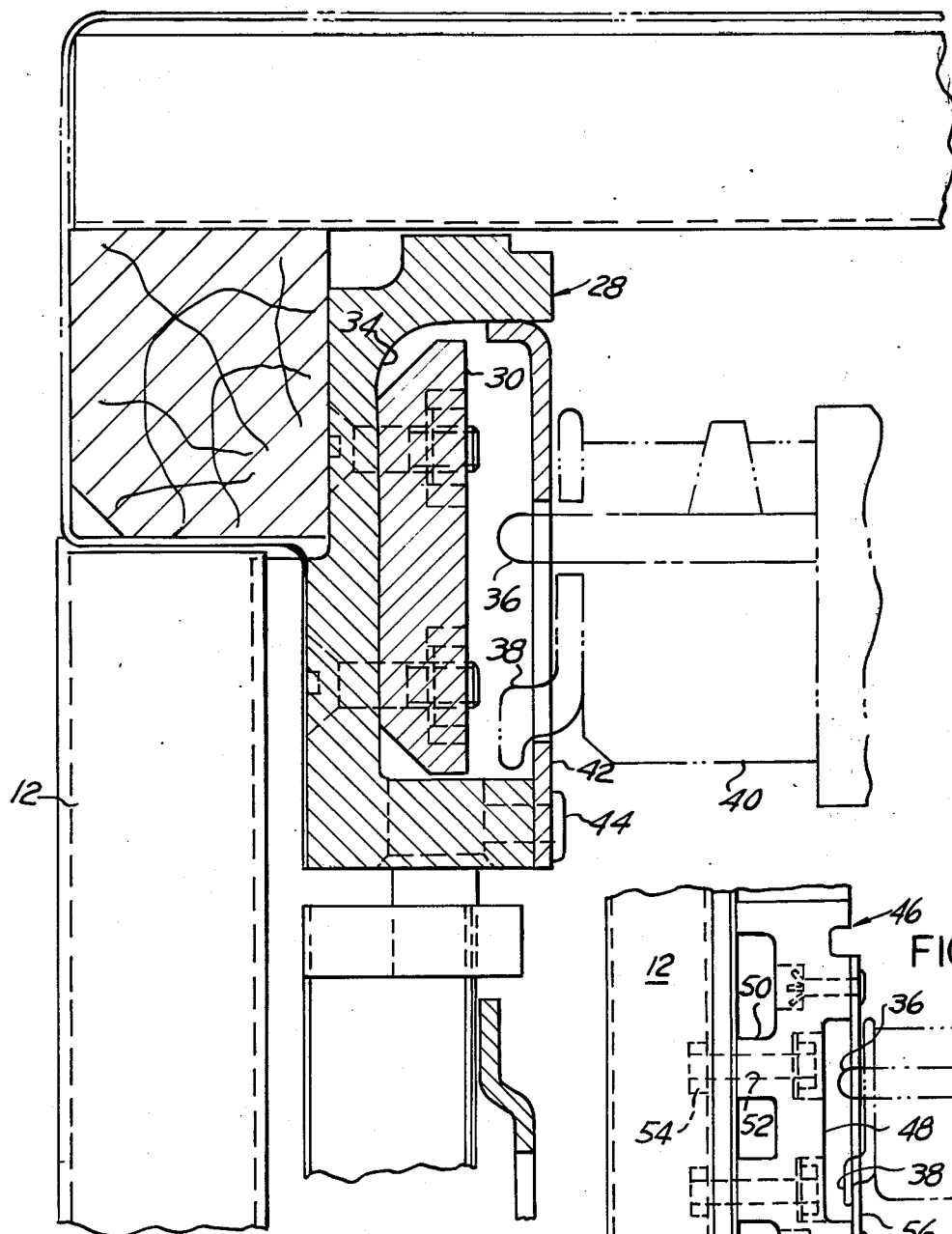
FIG. 5 is an enlarged sectional view on the line 5—5, FIG. 4.

Referring now to FIG. 5, the upper support element 28 is provided with a longitudinally extending inwardly facing continuous recess 34 which provides space for the splice elements 30 if used and which also provides additional space for the reception of the ends of latching elements 36 and 38 provided at the ends of cargo restraint bars 40.

Extending longitudinally over and enclosing the longitudinally extending space 34 is an upper belt rail 42 the upper and lower edges of which may be affixed to the rail 28 by conventional fastening means such for example as expanding rivets 44.

Figure 6:
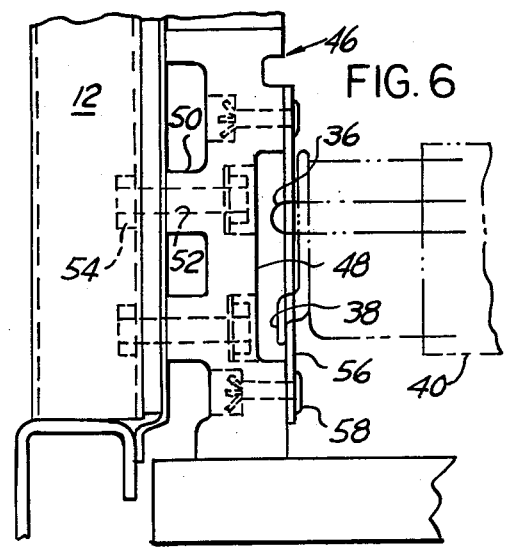
FIG. 6 is a sectional view similar to that of FIG. 5, illustrating the configuration of the bottom rail.

Referring now to FIG. 6 the configuration of the bottom rails 46 is illustrated. These rails are similar in cross-sectional shape to the upper elements 28 and are provided with a longitudinally extending continuous inwardly facing recess 48. The outer sides of the rails 46 include ribs 50 apertured as indicated at 52 for the reception of fasteners 54 by means of which the bottom rail 46 is affixed to the side 12 of the cargo container adjacent its bottom edge.

The elongated continuous inwardly facing recesses or channels 48 are covered by lower belt rails 56 attached to the lower rail by suitable fastening means such for example as the split rivets indicated at 58. The space between the recess 48 and the lower belt rails 56 receives the latch elements 36 and 38 at the end of the transversely extending cargo restraint bar 40.

Attached to the vertical posts 20 are vertically extending belt rails indicated generally at 64. These belt rails are of generally L-shaped cross-section and include longitudinally extending legs 66 terminating in short flanges 68 which are welded as indicated at 70 to the vertical posts 20. The vertical belt rails 64 include transversely extending legs 72 which if desired may also be welded to the posts 20. The longitudinally extending vertical legs 66 are spaced from the adjacent side of the posts to provide a space 74 for the reception of latch elements such as those illustrated at 36,38 at the ends of cargo restraint bars 40.

Figure 4:
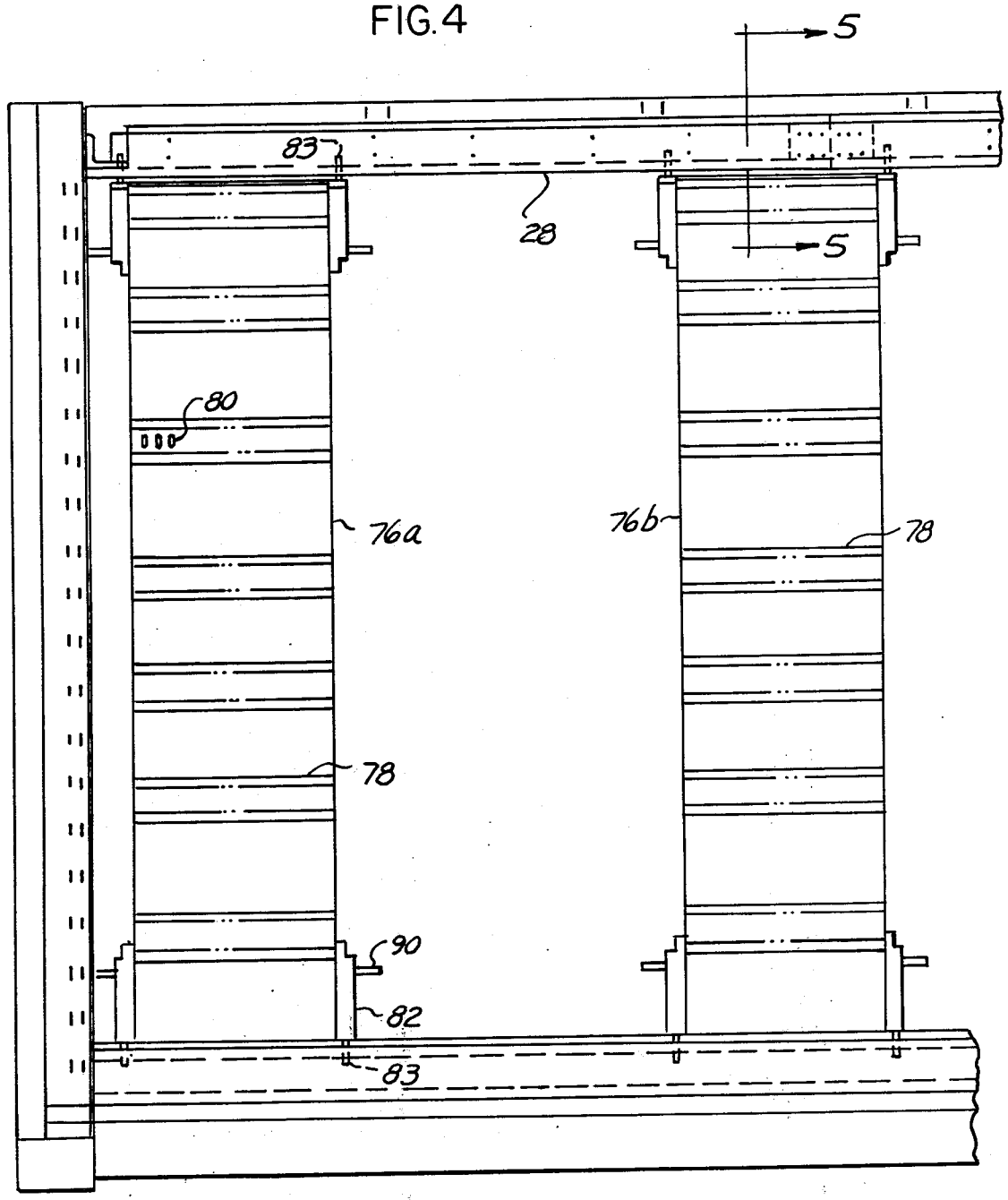
FIG. 4 is a fragmentary elevational view showing adjustable panels in position between upper and lower rails.

Panels indicated generally at 76 are provided each of which has secured thereto short lengths of belt rails 78 provided with a multiplicity of openings 80 for the reception of the latching elements 36,38 provided at the ends of the restraint bars 40. At the sides of the panels 76 there are provided releasable lock structures 82 each of which comprises a spring pressed pin 83 adapted to be projected downwardly from the lower locking structure 82 and upwardly from the upper lock structure as indicated at 84. Each of the pins is adapted to be received in pin receiving openings 86 in the lower rails or corresponding openings 88 provided at the lower side of the upper rails 28. The pins include laterally extending actuating portions 90 which are movable in slots 92. The arrangement is such that when the laterally extending actuating portions 90 are moved to retract the locking pins from the openings 86,88, the pins and actuating portions may be turned so that the actuating portions are out of alignment with the slots 92, thus latching the locking portions in retracted position. At this time the individual panels may be adjusted to whatever position is required, such for example as the position indicated at 76b in FIG. 4. The panel in the position 76b occupies an intermediate position between an end panel 76a and additional panels such as the one indicated at 76c in FIG. 1.

By providing for release of the panels 76 and shifting them into desired positions and relocking them in such adjusted position, a considerable savings in weight and material is provided as will be readily apparent.

It may be mentioned at this time that the openings in the various belt rails including the short sections 78 thereof provided on the panels 76 may be adapted to receive conventional latch means provided at the ends of presently available cargo restraint bars 40.

Figure 7:
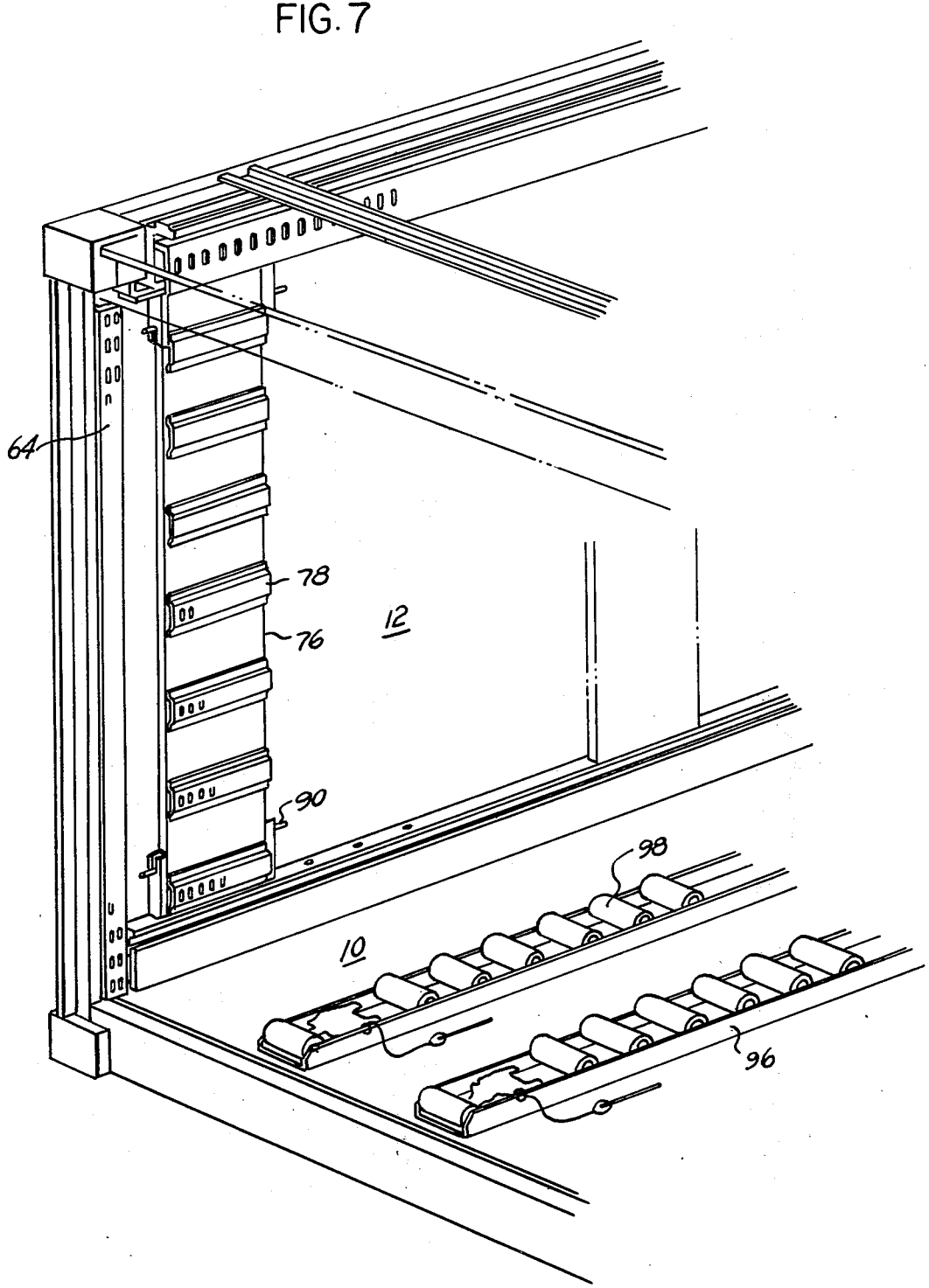
FIG. 7 is a fragmentary elevational view illustrating the provision of support rollers on the floor of the cargo space.

Referring now to FIG. 7 there is illustrated an arrangement in which elongated trays 96 are provided on the floor 10 of the cargo container, being attached thereto by any suitable hold-down means such as screws. Trays 96 are provided with a multiplicity of short rollers 98 so that the rollers facilitate movement of heavy cargo components over the floor of the cargo container. FIG. 7 illustrates the trays 96 and rollers 98 in position to receive cargo components introduced through the open rear end of the cargo container.

Inasmuch as the addition of the trays 96 and rollers 98 raises the effective support height of the floor 10, a feature of the present invention is the provision of the short sections 78 of the belt rail on the individual adjustable panels 76 at a spacing such that the panels may be inverted end for end depending on whether or not the rollers 98 are provided, thus positioning the short sections 78 of belt rail structure at desired vertical spacing from the effective floor support structure heights.

What we claim as our invention is:

1. A cargo container comprising an elongated container having a cargo space defined between a floor, longitudinally extending parallel vertical side walls, and a top wall,
    said container having vertical load-sustaining metal posts at the four corners thereof,
    a pair of upper rails extending longitudinally of the container at opposite sides thereof, and each upper rail fixed at its ends to the upper portions of the posts at one side of the container,
    a pair of lower rails extending longitudinally of the container at opposite sides thereof and fixedly secured thereto,
    a plurality of vertically elongated panels dimensioned to extend between the upper and lower rails,
    releasable locking means carried in part by said rails and in part by said panels adjacent the upper and lower ends thereof, said locking means when released permitting movement of said panels into desired positions longitudinally of said rails and engageable thereat to lock said panels in the desired positions,
    each of said panels having a plurality of vertically spaced horizontal belt rail portions each provided with a series of latch-receiving openings for receiving latch elements provided at opposite ends of cargo restraint bars adapted to be latched to extend between oppositely positioned pairs of panels locked at required positions longitudinally of said rails, the upper ends of said panels being located directly beneath said upper rails whereby the uppermost belt rail portions on said panels are below said upper rails, said upper rails being each provided along the inner side thereof with an elongated continuous recess, and an upper belt rail secured to each of said upper rails to overlie said recess from end to end, said upper belt rail having a series of latch-receiving openings for the latch elements provided at the end of the cargo restraint bars.

2. A cargo container as defined in claim 1 in which the lower ends of said panels being located directly above said lower rails whereby the lowermost belt portions on said panels are above said bottom rails, and said lower rails are each provided along the inner side thereof with an elongated continuous recess, a lower belt rail secured to each of said lower rails to overlie said recess from end to end, said lower belt rail having a series of latch-receiving openings for the latch elements provided at the ends of the cargo restraint bars.

3. A cargo container as defined in claim 2 comprising in addition a vertical belt rail fixedly connected to the inner side of each post, said vertical belt rails having a multiplicity of latch-receiving openings therein for the latch elements provided at the ends of the cargo restraint bars.

4. A cargo container as defined in claim 3 in which each of said vertical belt rails comprises an elongated member having angularly disposed flat legs, one of said legs having a short outwardly directed flange at its free edge welded to the inner surface of the post to which said vertical belt rail is secured to space said one leg from the adjacent post surface, said one leg having said multiplicity of openings therein, said spacing of said one leg from the adjacent post surface providing a space for receiving the latch elements at the ends of the cargo restraint bars which extend through said openings.

5. A cargo container as defined in claim 2 comprising in addition a vertical belt rail fixedly connected to the inner side of each post, said vertical belt rails having a multiplicity of latch-receiving openings therein for the latch elements provided at the ends of the cargo restraint bars, wherein the restraint bars can be positioned as required to extend between opposed pairs of panels extending between upper and lower belt rails, between the opposed belt rails secured to the upper rails, between the opposed belt rails secured to the lower rails, and between the opposed belt rails secured to said posts.

6. A cargo container as defined in claim 1, in which the floor of said container constitutes a selectively usable support for cargo, roller means comprising elongated supports adapted to be detachably secured to said floor, said supports comprising a multiplicity of rollers mounted for rotation on said supports, the upper surfaces of said rollers defining a cargo support surface located at a specific distance above said floor when said roller means is attached to said floor, the portion of the releasable locking means carried by said panels being cooperable with the portion of the releasable locking means carried by either the upper or lower rails, the belt rail portions on said panels being located thereon in positions such that by inverting the panels, panel belt rail portions may be provided at a required vertical spacing from either the cargo supporting surface constituted by said floor or by the surface defined by the upper surfaces of said rollers.

* * * * *